United States Patent [19]

Ito et al.

[11] Patent Number: 4,505,942

[45] Date of Patent: Mar. 19, 1985

[54] MANUFACTURE OF SNACK FOODS

[76] Inventors: Hideaki Ito, No. 8-19, Kita 2-chome, Okegawa-shi, Saitama-ken; Haruo Ito, No. 4-29, Amagasuka 4-chome, Yokkaichi-shi, Mie-ken, both of Japan

[21] Appl. No.: 556,278

[22] Filed: Nov. 30, 1983

[51] Int. Cl.$^3$ .............................................. A23L 1/01
[52] U.S. Cl. .................... 426/551; 426/549; 426/804; 426/808; 426/629
[58] Field of Search .............. 426/551, 549, 656, 804, 426/808, 629

[56] References Cited

U.S. PATENT DOCUMENTS 3,911,142  10/1975  Huelskamp ......................... 426/808
4,151,307   4/1979  Yueh et al. ......................... 426/549

FOREIGN PATENT DOCUMENTS 0088337  8/1978  Japan ................................ 426/804

*Primary Examiner*—Raymond Jones
*Assistant Examiner*—Elizabeth A. King
*Attorney, Agent, or Firm*—Hill, Van Santen, Steadman & Simpson

[57] ABSTRACT

A method for making a base material for a snack food wherein 100 parts of a bean-cured refuse are mixed with 120 to 180 parts of wheat flour, 30 to 70 parts starch, and 12 to 28 parts water. The mixture is steamed and boiled into a rice-cake state after which the mixture is formed into a sheet, cooled, and matured. The mixture is then dried to produce a base material having a water content of 13 to 20% by weight. This base material can then be suitably processed to form a nutrition snack food.

7 Claims, No Drawings

MANUFACTURE OF SNACK FOODS

BACKGROUND OF THE INVENTION

1. Field of the Invention

This invention is in the field of the manufacture of snack foods utilizing a bean-curd refuse which is a by-product resulting from the manufacture of soybean milk, and to which wheat flour and starch are added as viscosity enhancing materials.

2. Description of the Prior Art

Conventional snack foods are mostly made from wheat flour, corn, rice, or potatoes. Particularly in Japan, such snack foods are manufactured by a process in which the main ingredients are mixed together with seasoning and leavening agents, steamed or boiled into a rice-cake state, rolled into sheets, and then cooled and ripened. The sheet is then cut into a desired shape and dried to make the base material. This base material is transformed into the snack food by preheating, frying in oil or toasting or roasting and seasoning to produce foods such as rice crackers, rice-cake cubes, and the like.

SUMMARY OF THE INVENTION

Recent studies have shown additional benefits from natural foods, particularly soybean milk. It has been recognized again that high quality plant protein is contained in soybean milk which is highly nutritious and that the linoleic acid present is effective for controlling cholesterol.

In accordance with the present invention, bean-curd refuse which is a by-product in the production of soybean milk is used as a principal ingredient in the manufacture of snack foods. Although sometimes used as a food itself, bean-curd refuse (also known as okara or soy pulp) is presently available in large amounts as the production of soybean milk has increased, but only a small portion of it has been used as food, with the remainder being used as a feed for animals or discarded. Utilization of bean-curd refuse is therefore socially important. In addition, bean-curd refuse contains almost the same amount of protein and fat as soybean milk, providing consumers with snack foods which are high in nutrition.

After soybeans have been ground, the smooth purée is immersed in boiling water, returned to the boil, and simmered. The boiled product is then filtered through a filter cloth or by means of a hydraulic press or centrifuge. The insoluble residue which remains constitutes the bean-curd refuse. It contains about 17% of the protein in the original soybeans.

The following table provides a comparison between the nutrients in soybean milk and the bean-curd refuse:

TABLE 1

|  | Carbohydrate | Protein | Fat | Water |
| --- | --- | --- | --- | --- |
| Soybean Milk |  | 3.2 | 3.7 | 93.1 |
| Bean-curd refuse | 9.7 | 4.8 | 3.6 | 81.9 |

DESCRIPTION OF THE PREFERRED EMBODIMENTS

It was found that as the amount of bean-curd refuse is increased, it is difficult to make it into a rice-cake state in the conventional process of producing rice-cake cubes which are familiar snack foods to Japanese people. In the usual process of making such snack foods, the raw materials are mixed, steamed, and boiled into a rice-cake state.

As shown in Table 1, the beam-curd refuse contains carbohydrate, protein and fat only and does not contain starch so it does not become viscous even when heated and mixed. Consequently, a suitable base material cannot be formed unless some starchy material such as wheat flour is added. As shown in the following Table 2, an experiment was made varying the ratio of bean-curd refuse to wheat flour with the following results:

TABLE 2

| Relation between bean-curd refuse and wheat flour | | | | | |
| --- | --- | --- | --- | --- | --- |
|  | 1st test | 2nd | 3rd | 4th | 5th |
|  |  | parts by volume | | | |
| Bean-curd refuse | 100 | 100 | 100 | 100 | 100 |
| Wheat flour | 90 | 120 | 150 | 180 | 210 |
| Starch | 50 | 50 | 50 | 50 | 50 |
| Water | 0 | 8 | 20 | 35 | 50 |
| Water/total volume | 39% | 32% | 32% | 32% | 32% |
| Rice-cake state | Fair | Good | Excellent | Excellent | Excellent |
| Taste |  | Good | Excellent | Good | Fair |

Note: Cake is hard and sheeting is impossible.

In the foregoing experiment, the rice-cake conditions of the material were observed with the volumes of bean-curd refuse and starch fixed, and the volume of wheat flour varied. When the wheat flour is present in large amounts, the rice cake conditions are good but the taste is poor. It was found also that when the wheat flour was added in too small an amount, the rice-cake was not glutinous and could not be rolled into a sheet. As a result of this experiment, it was found that where 100 parts by volume of bean-curd refuse were added to 90 to 210 parts by volume of wheat flour and 50 parts by volume of starch, a good result was obtained when 120 to 180 parts by volume of wheat flour were added.

Another problem which occurs results from the necessity of adding a viscous material such as starch to the base since the base becomes easily cracked when rolled and dried if the content of bean-curd refuse is increased. Since the bean-curd refuse does not contain any viscous material itself, the cake is easily cracked in the process where the raw materials are mixed, steamed, and boiled into a rice-cake state, rolled and dried if the volume of starch present is small. In accordance with the present invention, this problem was solved by adding not only wheat flour but also a kind of starch which was more viscous and elastic that wheat flour to the bean-curd refuse. In the group of starches, viscosity increases in the following order:

Corn starch, sweet potato, potato and tapioca.

The base becomes more resistant to cracking when starch with a higher viscosity is used.

In the following table, there is shown results of experiments made using sweet potato or potato starch. 100 parts of bean-curd refuse was used in conjunction with 150 parts of wheat flour, and the volume of starch was varied.

TABLE 3

|  | 1st test | 2nd test | 3rd test parts | 4th test | 5th test |
| --- | --- | --- | --- | --- | --- |
| Bean-curd refuse | 100 | 100 | 100 | 100 | 100 |

TABLE 3-continued

|  | 1st test | 2nd test | 3rd test | 4th test | 5th test |
|---|---|---|---|---|---|
|  |  |  | parts |  |  |
| Starch | 10 | 30 | 50 | 70 | 90 |
| Wheat flour | 150 | 150 | 150 | 150 | 150 |
| Water | 2 | 11 | 20 | 30 | 40 |
| Rice-cake conditions | Good | Excellent | Excellent | Excellent | Good (Too elastic) |
| Base conditions | Easily cracked | Good | Excellent | Excellent | Good |

In the above experiment, the strength of the base was observed by varying the ratio of bean-cured refuse to starch. It was found that the base was easily cracked when the volume of starch was small. On the other hand, when the volume of starch was too large, the rice-cake became very elastic making it difficult to process it. Good results were obtained from the second to fourth tests utilizing 150 parts of wheat flour and 30 to 70 parts starch for every 100 parts of bean-curd refuse. It was therefore concluded that the best procedure was to add 120 to 180 parts of wheat flour and 30 to 70 parts of starch to 100 parts of the bean-curd refuse.

Another problem which arises is selecting the proper volume of water to be added to the bean-curd refuse, wheat flour and starch since the bean-curd refuse contains substantial amounts of moisture. In the manufacture of typical flour-cake cubes, a good cake is obtained using about 35 kg of water to 100 kg of wheat flour. However, when the bean-curd refuse is used, the amount of water to be added is an important problem since the bean-curd refuse itself contains about 82% water. The relation of water to bean-curd refuse, starch and wheat flour was tested utilizing the best volume relationships according to Tables 2 and 3, with the water content of the bean-curd refuse assumed to be 82%. The following table lists the results.

TABLE 4

|  | 1st test | 2nd test | 3rd test | 4th test | 5th test | 6th test |
|---|---|---|---|---|---|---|
|  |  |  | parts |  |  |  |
| Bean-curd refuse | 0 | 100 | 100 | 100 | 100 | 100 |
| Wheat flour | 100 | 150 | 150 | 150 | 150 | 150 |
| Starch | 20 | 50 | 50 | 50 | 50 | 50 |
| Water | 35 | 4 | 12 | 20 | 28 | 36 |
| "Rice-cake" conditions | Excellent | Too hard | Excellent | Excellent | Excellent | Too soft |
| Total solid part | 77.4% | 71.7% | 69.9% | 68.1% | 66.5% | 64.9% |
| Total moisture content | 22.6% | 28.3% | 30.1% | 31.9% | 33.5% | 35.1% |

The first test illustrates the standard compound ratio in flour-cake cubes, wherein the total moisture content is 22.6%. When the bean-cured refuse is added, the water content becomes 28 to 33% as shown in the third to fifth tests since the bean-curd refuse has a high moisture content. If more water than this is added, the rice-cake becomes too soft for proper sheeting to be made.

As seen from Table 4, good results could be obtained where the moisture content was about 30 to 33%.

The bean-curd refuse contains about 50% fibrous material and the problem arose as to how to make it soft and pleasant to the tongue. This was accomplished by softening and swelling the fibrous material by immersing the bean-curd refuse in a slightly alkaline solution prior to mixing with the other ingredients, making the product base smooth, soft, and pleasant to the tongue.

Specifically, the bean-curd refuse was immersed in a slightly alkaline buffer solution containing sodium bicarbonate, potassium bitartrate and alum having a pH of 7.5 to 8.5 for about 5 to 12 hours. This was followed by adding 120 to 180 parts of wheat flour, 30 to 70 parts of starch, and 12 to 28 parts of water, some seasoning and leavening agents such as baking powder or sodium bicarbonate to 100 parts of the bean-curd refuse. The mixture is then mixed, steamed and boiled to obtain a soft and elastic rice-cake-like substance. This material can be rolled by means of a roller into a sheet having a thickness of 1 to 3 mm followed by cooling and ripening the sheet to mature it. The sheet is then cut into particular sizes and shapes and dried to produce a base material having a 13 to 20% moisture content. This base material is then made into a snack food by preheating, frying in oil, or toasting, or by roasting, followed by seasoning the base material.

The cake made from the base material is soft and pleasant to the tongue and is not rough due to the presence of fiber even if a substantial amount of bean-curd refuse is used. It is neither too soft nor too elastic when steamed and boiled together with wheat flour and starch mixed in. The base material does not crack even when rolled into a sheet and dried. Delicious snack foods can be made which have the mellow sweetness characteristic of soybean milk.

It will be evident that various modifications can be made to the described embodiments without departing from the scope of the present invention.

We claim as our invention:

1. A method for making a base material for a snack food which comprises mixing 100 parts of bean-curd refuse with 120 to 180 parts of wheat flour, 30 to 70 parts starch, and 12 to 28 parts water, steaming and boiling the resulting mixture into a rice-cake state, forming the mixture into a sheet, cooling and maturing the mixture, and drying the matured mixture to produce a base material having a water content of 13 to 20%.

2. A method according to claim 1 which includes the step of adding a leavening agent to the original mixture.

3. A method according to claim 1 in which said sheet has a thickness of about 1 to 3 mm.

4. A method according to claim 1 wherein said bean-curd refuse prior to said mixing is immersed in a mildly alkaline solution having a pH of 7.5 to 8.5 for 5 or 12 hours.

5. A method according to claim 4 in which said mildly alkaline solution contains sodium bicarbonate, potassium bitartrate, and alum.

6. A method according to claim 1 in which said starch is sweet potato starch.

7. A method according to claim 1 in which said starch is potato starch.

* * * * *